(12) United States Patent
Wada et al.

(10) Patent No.: US 6,784,239 B2
(45) Date of Patent: Aug. 31, 2004

(54) DURABLE WATER REPELLENT AND COATED ARTICLES

(75) Inventors: Susumu Wada, Settu (JP); Kayoko Honda, Settu (JP); Keiko Kunimasa, Settu (JP); Katsuhiko Imoto, Settu (JP)

(73) Assignee: Daikin Industries, Ltd., Osaka (JP)

( * ) Notice: Subject to any disclaimer, the term of this patent is extended or adjusted under 35 U.S.C. 154(b) by 39 days.

(21) Appl. No.: 10/097,303

(22) Filed: Mar. 15, 2002

(65) Prior Publication Data

US 2002/0143099 A1 Oct. 3, 2002

Related U.S. Application Data

(62) Division of application No. 09/308,162, filed as application No. PCT/JP97/04178 on Nov. 18, 1997.

(30) Foreign Application Priority Data

Nov. 18, 1996 (JP) ................................ 8-323557

(51) Int. Cl.⁷ ............................... C08L 27/12
(52) U.S. Cl. ................ 524/544; 524/545; 524/546; 525/199
(58) Field of Search ................... 524/544, 545, 524/526, 546; 525/199

(56) References Cited

U.S. PATENT DOCUMENTS 4,075,362 A  2/1978  Concannon
5,462,586 A * 10/1995 Sugiyama et al. ............. 96/13
6,410,626 B1 * 6/2002 Wada et al. ................. 524/266

FOREIGN PATENT DOCUMENTS

| EP | 0700975 A1 | 3/1996 |
|---|---|---|
| EP | 0930338 A1 | 7/1999 |
| JP | 2140255 | 5/1990 |
| JP | 3007784 | 1/1991 |
| JP | 4033942 | 2/1992 |
| JP | 4-85369 | 3/1992 |
| JP | 5156029 | 6/1993 |
| JP | 5-170909 | 7/1993 |
| JP | 7-126428 | 5/1995 |
| JP | 7268163 | 10/1995 |

* cited by examiner

Primary Examiner—Peter D. Mulcahy
(74) Attorney, Agent, or Firm—Connolly Bove Lodge & Hutz LLP

(57) ABSTRACT

A durable water repellent agent comprising a repellent and a fluorine-containing resin, wherein the repellent comprises at least one member selected from the group consisting of a perfluoroalkyl group-containing substance (I), a fluorine-containing surfactant (II), a fluorine-containing oil (III), a fluorosilicone oil (IV) and a silicone oil (V), the solid content weight ratio between said repellent and said fluorine-containing resin being (repellent):(fluorine-containing resin)=50:50 to 99:1.

10 Claims, No Drawings

DURABLE WATER REPELLENT AND COATED ARTICLES

This application is a division of Ser. No. 09/308,162 filed Jul. 7, 1999 which is a 371 of PCT/JP97/04178 filed Nov. 18, 1997.

TECHNICAL FIELD

The present invention relates to a durable water repellent agent capable of maintaining its effect over a prolonged period of time.

BACKGROUND ART

Water repellent compositions which form coating films on concrete, wood, cloth and other substrates to show the water repelling property and are useful in various fields have been widely used in the field of construction and building materials, for instance. Those organosilicon and like compounds have so far been used as such repellents, however, which cannot fully show their repellent property when pools of water stay on the substrate surface for long. In addition, they are poor in weather resistance.

Therefore, the use of fluorine-containing resins has been proposed. For example, Japanese Patent Publication Sho-62-16141 proposed that a coating composition comprising an epoxy resin and/or a phenol/alkyd resin or the like be used as an undercoat and a coating composition which mainly has a fluorine-containing copolymer having reactive sites for curing reactions, such as hydroxybutyl vinyl ether, glycidyl vinyl ether or the like be coated on the undercoat layer. However, though such a fluorine-containing copolymer is excellent in durability for the so-called paint resins, it hardly shows its water repellency at 110° C. and above. The copolymer has another drawback, viz. when it is used to coat concrete or wood, it is difficult to retain the natural feel of the material and, when it is applied to cloths, their unique feel can hardly be preserved.

Concrete, wood, cloth and the like generally contain moisture and, for long-term use, the coating should be resistant or impervious to invasion of moisture from the outside of the coating as well. To solve this problem and workability-related problems, Japanese Kokai Publication Hei-02-52074 discloses a technology which uses a curing agent-free, noncrosslinking type fluorine-containing copolymer in a one component. However, this technology is still lacking in the ability to retain the natural feel of concrete or wood or the unique feel of cloths.

Japanese Kokai Publication Hei-02-107583 discloses a coating composition for cement-based concrete in which a water and oil repellent agent comprising a specific fluorine-containing silane compound is used and therefore which is excellent in weather resistance and stain resistance. From the viewpoint of long-term water repellent effect, however, this is still unsatisfactory.

Japanese Kokai Publication Hei-05-200353 discloses a technology according to which a coating composition comprising a hydroxyl- or carboxyl-containing fluoroolefin copolymer and a specific silane compound is used as a coating composition suited for application to cement-based substrates. However, while this technology attaches great importance to durability, it does not attend itself to water repellency.

International patent specification WO 95/18188 discloses a coating composition comprising a polyfluorinated carbon chain-containing compound and a silicone oil so that water and oil repellency and stain resistance may be acquired simultaneously. However, this composition has no effects in retaining the natural feel of concrete or wood or in retaining the unique feel of cloths.

Meanwhile, in recent years, acid rains associated with changes in the environment have become a serious problem and their influence on the human body and their erosive action on automotive body paint films and on the exterior walls and windowpanes of buildings and other structures, for instance, has been a serious concern. However, no effective means have so far been available against the problems caused by such acid rains.

SUMMARY OF THE INVENTION

In view of the current state of art mentioned above, it is an object of the present invention to provide a durable water repellent agent which can impart good water repellency to moisture-containing substrates such as concrete, wood, cloths, etc. and be expected to be effective against acid rain and which can maintain the natural material feel and unique feel of concrete, wood and cloths and can retain its water repellency for a prolonged period of time, and coated articles, in particular articles made of concrete, with said repellent composition applied thereto.

The durable water repellent agent of the present invention is a durable water repellent agent comprising a repellent and a fluorine-containing resin, and said repellent comprises at least one member selected from the group consisting of a perfluoroalkyl group-containing substance (I), a fluorine-containing surfactant (II), a fluorine-containing oil (III), a fluorosilicone oil (IV) and a silicone oil (V), the solid content weight ratio between said repellent and said fluorine-containing resin being (repellent):(fluorine-containing resin)=50:50 to 99:1.

DETAILED DESCRIPTION OF THE INVENTION

In the following, the present invention is described in detail.

The first constituent usable in the durable repellent composition of the present invention is a repellent. Said repellent comprises a perfluoroalkyl group-containing substance (I), a fluorine-containing surfactant (II), a fluorine-containing oil (III), a fluorosilicone oil (IV) or a silicone oil (V), or a mixture of two or more of these. In the following, these repellent components are described in detail.

The first of the repellent components to be used in the present invention is a perfluoroalkyl group-containing substance (I). Said perfluoroalkyl group-containing substance (I) is one of a perfluoroalkyl group-containing polymer (I-1), the reaction product (I-2) from a perfluoroalkyl group-containing compound (I-2-1) and an isocyanate compound (I-2-3) and the esterification reaction product (I-3) from a perfluoroalkyl group-containing compound (I-3-1) and a compound (I-3-2) containing a carboxylic acid or phosphoric acid group as a functional group, or a mixture of two or more of these. Among them, the esterification reaction product (I-3) from a perfluoroalkyl group-containing compound and a compound containing a carboxylic acid or phosphoric acid group as a functional group is preferred. In the following, these components are described in detail.

A first example of the perfluoroalkyl group-containing substance (I) to be used in the present invention is a perfluoroalkyl group-containing polymer (I-1). As said perfluoroalkyl group-containing polymer (I-1), there may be mentioned, among others, a homopolymer of a perfluoroalkyl group-containing ethylenically unsaturated monomer and a copolymer of said monomer and one or more other monomers.

Said perfluoroalkyl group-containing ethylenically unsaturated monomer includes, among others, compounds represented by the following formulas:

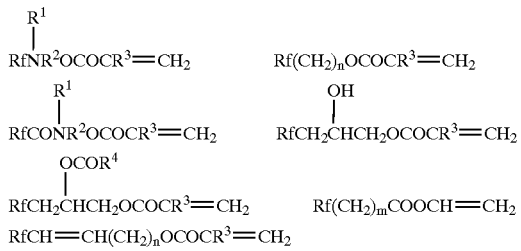

In the above formulas, Rf represents a perfluoroalkyl group whose alkyl moiety contains 4 to 20 carbon atoms, $R^1$ represents hydrogen or an alkyl group containing 1 to 10 carbon atoms, $R^2$ represents an alkylene group containing 1 to 10 carbon atoms, $R^3$ represents hydrogen or a methyl group, $R^4$ represents an alkyl group containing 1 to 17 carbon atoms, n represents an integer of 1 to 10 and m represents an integer of 0 to 10.

As the other monomer(s) copolymerizable with said perfluoroalkyl group-containing ethylenically unsaturated monomer, there may be mentioned, for example, alkyl (meth)acrylates containing 1 to 20 carbon atoms in the alkyl moiety, cyclohexyl (meth)acrylate, benzyl (meth)acrylate, polyethylene glycol di(meth)acrylate, N-methylolacrylamide, ethylene, vinyl chloride, vinyl fluoride, (meth)acrylamide, styrene, α-methylstyrene, p-methylstyrene, vinyl alkyl ethers containing 1 to 20 carbon atoms in the alkyl moiety, halogenated alkyl vinyl ethers containing 1 to 20 carbon atoms in the alkyl moiety, vinyl alkyl ketones containing 1 to 20 carbon atoms in the alkyl moiety, maleic anhydride, butadiene, isoprene, chloroprene; silyl-containing vinyl monomers such as vinyltriethoxysilane, vinyltrimethoxysilane and γ-(methacryloxypropyl) trimethoxysilane, and so forth.

Solutions or dispersion of such a copolymer in an organic solvent or an aqueous medium are commercially available. As such, there may be mentioned, for example, Unidine TG-652 (product of Daikin Industries), Unidine TG-664 (product of Daikin Industries), Unidine TG-410 (product of Daikin Industries) and the like.

A second example of the perfluoroalkyl group-containing substance (I) to be used in the present invention is the reaction product (I-2) from a perfluoroalkyl group-containing compound (I-2-1) and an isocyanate compound (I-2-3).

Said perfluoroalkyl group-containing compound (I-2-1) may be represented by the following general formulas:

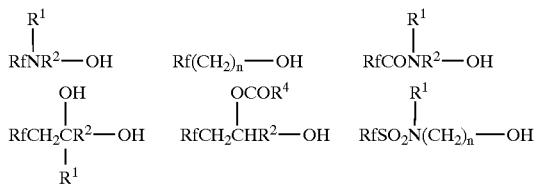

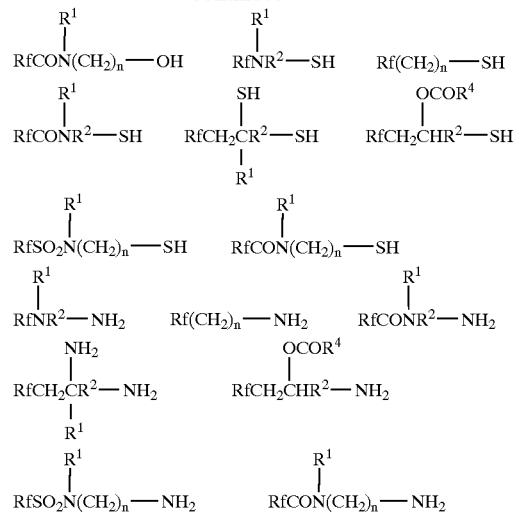

In the above formulas, Rf, $R^1$, $R^2$, $R^4$ and n are as defined above.

Said isocyanate compound (I-2-3) includes aliphatic, alicyclic or aromatic monoisocyanato group-containing compounds; polyisocyanate compounds such as hexamethylene diisocyanate, trimethylhexamethylene diisocyanate, hexamethylene triisocyanate, lysine ester triiisocyanates, isophoronediisocyanate, hydrogenated xylylene diisocyanate, toluenediisocyanate, xylylene diisocyanate, diphenylmethanediisocyanate, etc.; modifications of these, such as trisbiuret modifications, isocyanurate modifications and triol modifications, and so on.

As the reaction product (I-2) from said perfluoroalkyl group-containing compound and said isocyanate compound, there may also be mentioned such commercial products as Daiguard RE (product of Daiwa Chemical Industries) and the like.

A third example of the perfluoroalkyl group-containing substance (I) to be used in the present invention is the esterification reaction product (I-3) from a perfluoroalkyl group-containing compound (I-3-1) and a compound (I-3-2) containing a carboxylic acid or phosphoric acid group as a functional group.

Said perfluoroalkyl group-containing compound (I-3-1) may be represented by the following general formulas:

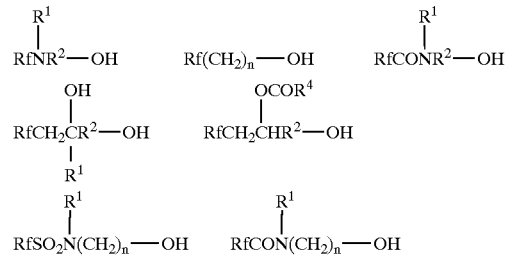

In the above formulas, Rf, $R^1$, $R^2$, $R^4$ and n are as defined above.

As said reaction product (I-3) from said perfluoroalkyl group-containing compound (I-3-1) and said compound (I-3-2) containing a carboxylic acid or phosphoric acid group as a functional group, there may also be mentioned such commercial products as TG101 (product of Daikin Industries) and the like.

Fluorine-containing Surfactant (II)

The second repellent usable in the present invention is a fluorine-containing surfactant (II). Said fluorine-containing surfactant is a perfluoroalkyl group-containing surfactant or a perfluoroalkylene group-containing surfactant and includes anionic fluorine-containing surfactants, cationic fluorine-containing surfactants, amphoteric fluorine-containing surfactants and nonionic fluorine-containing surfactants. More specifically, there may be mentioned Unidine DS-101 (product of Daikin Industries), Unidine DS-202 (product of Daikin Industries), Unidine DS-301 (product of Daikin Industries), Unidine DS-406 (product of Daikin Industries) and so on.

Fluorine-containing Oil (III)

The third repellent usable in the present invention is a fluorine-containing oil (III). As said fluorine-containing oil, there may be mentioned perfluoropolyethers or chlorotrifluoroethylene polymers, and other specific fluorinated hydrocarbon compounds, among others. More specifically, Demnum S-20 (product of Daikin Industries), Daifloil #20 (product of Daikin Industries), etc.

Fluorosilicone Oil (IV)

The fourth repellent usable in the present invention is a fluorosilicone oil (IV). Said fluorosilicone oil (IV) comprises a polysiloxane having a fluoroalkyl group on a side chain or at a terminus thereof. More specifically, there may be mentioned FS-1265 (product of Toray Dow Corning Silicone), X-22-819 (product of Shin-Etsu Chemical Co.), FL 100 (product of Shin-Etsu Chemical Co.) and the like.

Silicone Oil (V)

The fifth repellent usable in the present invention is a silicone oil (V). As said silicone oil (V), there may be mentioned silicone oils having a viscosity at 25° C. of not less than 50 cps, or silicone oils having a reactive group on a side chain or a terminus thereof. More specifically, there may be mentioned dimethylsilicone oils, methyl chlorinated silicone oils, methylphenylsilicone oils, organic group-modified silicone oils, etc. For example, compounds represented by the following formulas, among others, may be mentioned:

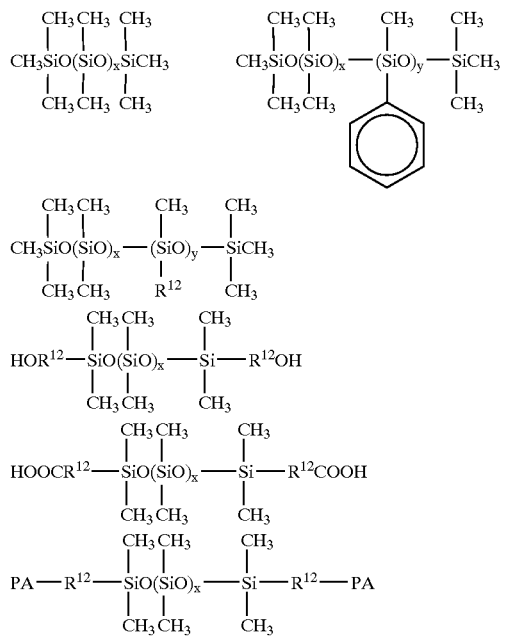

-continued

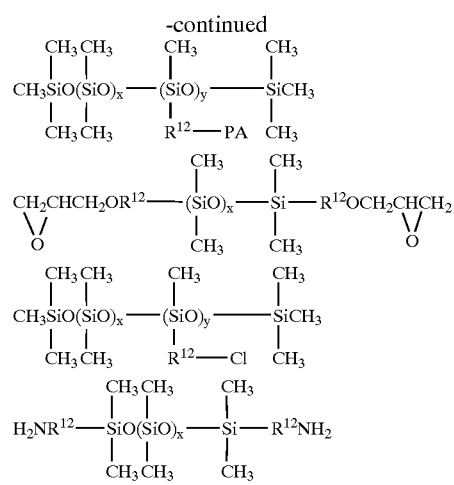

In the above formulas, $R^{12}$ represents an alkylene group containing 1 or more carbon atoms, PA represents a polyalkylene oxide, and x and y each represents an integer of 1 or more.

More specifically, there may be mentioned, for instance, PRX 413 (product of Toray Dow Corning Silicone), SF8417 (ditto), SF 8418 (ditto), BY 16-855B (ditto), SF 8427 (ditto), SF 8428 (ditto), X-22-161C (product of Shin-Etsu Chemical Co.), KF-857 (ditto), KP-358 (ditto), KP-359 (ditto) and the like.

The second constituent of the durable water repellent agent of the present invention is a fluorine-containing resin. Said fluorine-containing resin may be in the form of an aqueous dispersion or in the form of dissolving in a solvent.

In constituting the durable water repellent agent of the present invention, the fluorine-containing resin mentioned above may be used in the form of an aqueous dispersion prepared by dispersing the same in an aqueous medium or in the form of a resin solution prepared by dissolving the same in an appropriate solvent. From the viewpoint of no odor emanation and environment-friendliness, the form of an aqueous dispersion is preferred, however.

Said aqueous dispersion and said resin solution will be described in detail later herein.

The fluorine-containing resin mentioned above is composed of a fluororesin or a mixture of a fluororesin and at least one other resin. Said other resin includes, among others, acrylic resins, acrylsilicone resins, epoxy resins, urethane resins, ester type resins and so forth. From the viewpoint of the stability or durability of the durable water repellent agent of the present invention, however, acrylic resins are preferred.

As is evident from the above description, the "fluorine-containing resin" as so referred to in this specification includes, within the meaning thereof, the "fluororesin" mentioned above as it is or a mixture of said "fluororesin" and at least one "other resin". In this specification, said "other resin" includes acrylic resins, acrylsilicone resins, epoxy resins, urethane resins, ester type resins and the like and, preferably, said term means acrylic resins alone.

Said acrylic resins as other resins will be described in detail later herein.

The fluororesin mentioned above roughly includes the following four classes:

Fluororesin (1) comprising a copolymer of a fluoroolefin and a vinyl monomer;

Fluororesin (2) comprising a fluoroolefin copolymer;

Fluororesin (3) comprising a fluoroolefin homopolymer;

Fluororesin (4) prepared by seed polymerization of said fluororesin (1), said fluororesin (2) or said fluororesin (3) and an acrylic resin in an aqueous dispersion.

As is evident from the above description, the term "fluororesin" as used in this specification means a copolymer of one or more fluoroolefins and one or more vinyl monomers, a copolymer of two or more fluoroolefins, or a homopolymer of a fluoroolefin. Furthermore, in this specification, the term "fluororesin" also means a fluororesin (4) prepared by seed polymerization of an acrylic resin obtained by causing an acrylic monomer to form a composite resin in an aqueous medium in the presence of resin particles comprising said fluororesin (1), said fluororesin (2) or said fluororesin (3), in an "aqueous dispersion" to be described in detail later herein.

In the following, the acrylic resin as another resin constituting the fluorine-containing resin according to the present invention is described.

Said acrylic resin is not particularly restricted provided that it is a polymer whose main chain is a polymer constituted of a hydrocarbon chain derived from an acrylic acid and/or methacrylic acid. Generally, it includes, among others, homopolymers of an acrylic monomer, and copolymers of an acrylic monomer and other monomer(s) having an ethylenically unsaturated bond copolymerizable therewith.

Said acrylic monomer is not particularly restricted provided that it contains an acrylic acid and/or methacrylic acid (hereinafter also referred to as "(meth)acrylic acid") moiety. Thus, it may be acrylic acid, an alkyl acrylate, methacrylic acid or an alkyl methacrylate, for instance.

Said alkyl (meth) acrylate is not particularly restricted but includes, for instance, alkyl acrylates whose alkyl moiety contains 1 to 18 carbon atoms, and alkyl methacrylates whose alkyl moiety contains 1 to 18 carbon atoms.

As such alkyl acrylates whose alkyl moiety contains 1 to 18 carbon atoms, there may be mentioned methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, n-hexyl acrylate, t-butylcyclohexyl acrylate, stearyl acrylate and lauryl acrylate, among others.

As said alkyl methacrylates whose alkyl moiety contains 1 to 18 carbon atoms, there may be mentioned methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, cyclohexyl methacrylate, n-hexyl methacrylate, t-butyl cyclohexyl methacrylate, stearyl methacrylate and lauryl methacrylate, for instance.

The acrylic monomers mentioned above may be copolymerized with a polyfunctional monomer such as ethylene glycol dimethacrylate or propylene glycol dimethacrylate for the purpose of improving the solvent resistance and water resistance.

As the monomer having an ethylenically unsaturated bond copolymerizable with the acrylic ester and/or methacrylic ester mentioned above, there may be mentioned, among others, those mentioned below under (I) and (II).

(I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylolmethacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as γ-trimethoxysilane methacrylate, γ-triethoxysilane methacrylate, etc.; aldehyde-containing monomers such as acrolein etc.; caprolactone-modified hydroxy acrylates, and caprolactone-modified hydroxy methacrylates.

(II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinic anhydride, crotonic acid, etc.; aromatic vinyl compounds such as styrene, α-methylstyrene, p-tert-butylstyrene, etc.; acrylonitrile, and the like.

Use may also be made, as the monomer having an ethylenically unsaturated bond copolymerizable with the acrylic ester and/or methacrylic ester mentioned above, of compounds containing, within the molecule thereof, a hydrophilic site-containing, low-molecular-weight polymer or oligomer. Said hydrophilic site means a site having a hydrophilic group or a site having a hydrophilic bond, and a site comprising a combination of these. Said hydrophilic group may be an ionic, nonionic or amphoteric one or a combination of these. Nonionic or anionic hydrophilic groups are preferred, however. Any known reactive emulsifier may also be used.

As said monomer having an ethylenically unsaturated bond copolymerizable with the acrylic ester and/or methacrylic ester mentioned above, or the reactive emulsifier, there may be mentioned, for example, polyethylene glycol methacrylate, polypropylene glycol methacrylate, methoxypolyethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol polypropylene glycol mono-methacrylate, polyethylene glycol polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis (polyoxyethylene-polycyclic phenyl ether) methacrylated sulfuric acid ester salts, polyoxyethylene alkylphenyl ether acrylates, methacryloyloxypolyoxyalkylene sulfate salts, methacryloyloxyalkylene sulfate salts, polyoxyethylene vinyl ether, polyoxyethylene vinyl esters, and so on.

The method of polymerization for preparing a homopolymer of the acrylic monomer mentioned above or a copolymer of said acrylic monomer and other copolymerizable monomer(s) for the purpose of obtaining the acrylic resin of the present invention is not particularly restricted but can suitably be selected from among per se known methods, such as emulsion polymerization, suspension polymerization and bulk polymerization techniques. The molecular weight of the polymer after polymerization can suitably be selected considering the field of application thereof.

In carrying out the polymerization, the polymerization vessel, mode of polymerization, polymerization initiator, polymerization inhibitor, other auxiliaries, and emulsification auxiliaries, surfactant and other additives in emulsion polymerization, and other conditions can suitably be selected from among those known in the art. In selecting these, any of the so-far known ones can be employed on condition that the acrylic resin obtained is an adequate one.

The amount of the acrylic resin to be admixed for constituting the fluorine-containing resin of the present invention is preferably 0 to 90% by weight, more preferably 0 to 80% by weight. If the mixing amount is excessive, the weather resistance and acid rain resistance will be poor.

The method of admixing is not particularly restricted but a generally known method can be used.

The acrylic resin as another resin has now been fully described.

In the following, the "aqueous dispersion" in relation to the fluorine-containing resin of the present invention is described.

The aqueous dispersion has a basic structure in which fluororesin particles are dispersed in an aqueous medium. Said aqueous dispersion comprises (A-1) an aqueous dispersion of a fluororesin prepared by seed polymerization of an acrylic resin and (A-2) an aqueous dispersion of a fluororesin prepared without seed polymerization of an acrylic resin.

The aqueous dispersion of a fluororesin (A-1) is obtained by causing an acrylic monomer to form a fluorine-based composite resin in the presence of fluororesin particles in an aqueous medium.

Said aqueous medium is not particularly restricted but includes, among others, water supplemented with an additive, solvent and/or the like, which is to be mentioned in detail later herein.

In the above-mentioned aqueous dispersion of a fluororesin (A-1) derived from seed polymerization of an acrylic resin, the fluororesin constituting the fluororesin particles is a fluororesin (2) which is a fluoroolefin copolymer. Said fluoroolefin copolymer is dispersed in the aqueous medium in the form of particles and, when forming of a fluorine-containing composite resin by the acrylic monomer mentioned above, the polymerization is carried out in the manner of the so-called seed polymerization. In the present specification, the term "seed polymerization" means a polymerization reaction with another monomer or other monomers in an aqueous medium in which resin particles are present. Therefore, the fluorine-containing composite resin mentioned above means a seed polymer after said seed polymerization, and said resin particles means seed particles in said seed polymerization.

The fluororesin (2), which is a fluoroolefin copolymer, is described in the following.

Said fluoroolefin is not particularly restricted but includes, among others, vinylidene fluoride (VdF), tetrafluoroethylene (TFE), chlorotrifluoroethylene (CTFE) and hexafluoropropylene (HFP). Saidfluoroolefin copolymer is not particularly restricted but includes, among others, VdF/TFE copolymers, CdF/CTFE copolymers, VdF/HFP copolymers, TFE/CTFE copolymers, TFE/HFP copolymers, CTFE/HFP copolymers, VdF/TFE/CTFE copolymers, VdF/TFE/HFP copolymers, VdF/CTFE/HFP copolymers, VdF/TFE/CTFE copolymers, VdF/TFE/HFP copolymers, VdF/CTFE/HFP copolymers, TFE/CTFE/HFP copolymers, VdF/TFE/CTFE/HFP copolymers and the like.

Said fluoroolefin copolymer constituting seed particles is preferably a VdF-based copolymer which is a copolymer of VdF and fluoroolefin(s) other than VdF, more preferably a copolymer containing not less than 70 mole percent of VdF.

When VdF accounts for not less than 70 mole percent, the compatibility of the seed particles and the polymer derived from an acrylic monomer(s) becomes good.

The mean particle size of said seed particles is closely related to the mean particle size of the fluorine-based composite resin after seed polymerization. For the fluorine-based composite resin after seed polymerization to have a mean particle size of 50 to 300 nm, it is preferred that the seed particles size be 40 to 290 nm.

Said copolymer constituting seed particles can be obtained by ordinary emulsion polymerization techniques. For example, it can be prepared by emulsion polymerization of a monomer mixture containing the fluoroolefin mentioned above in the presence of 0.01 to 1.0% by weight, relative to water, of the fluorine-containing reactive emulsifier having the hydrophilic site, and 0 to 1.0% by weight, relative to water, of a fluorine-containing emulsifier.

It can be prepared also by emulsion polymerization of a monomer mixture containing said fluoroolefin in the presence of not more than 1.0% by weight, preferably not more than 0.5% by weight, more preferably not more than 0.2% by weight (the lower limit generally being 0.01% by weight), relative to water, of a fluorine-containing surfactant and 0.001 to 0.1% by weight, preferably 0.01 to 0.05% by weight, relative to water, of a nonionic fluorine-free surfactant. The aqueous dispersion obtained by such a method can stably contain seed particles with a mean particle size of not greater than 0.2 μm and a high concentration of 30 to 50% by weight.

As said fluorine-based reactive emulsifier having hydrophilic site, there may be mentioned, for example, those having a structure represented by the formula $CF_2=CF-(CF_2CFX)_nY$ (wherein X is F or $CF_3$, Y is $SO_3M$ or COOM (in which M is hydrogen atom, amine, ammonium or alkali metal) and n is an integer), $CF_2=CF-O(CFX)_nY$ (wherein X, Y and n are as defined above), $CH_2=CF-CF_2-O-(CF(CF_3)CF_2O)_n-CF(CF_3)Y$ (wherein Y and n are as defined above) or $CF_2=CF-CF_2-O-(CF(CF_3)CF_2O)_n-CF(CF_3)Y$ (wherein Y and n are as defined above). From the water solubility and surface activity viewpoint, n is preferably within the range of 0 to 3.

More specifically, those having the structure $CF_2=CF-CF_2-O-(CF(CF_3)CF_2O)_n-CF(CF_3)COOH$ which n is 0 to 2 are preferably used.

The polymerization temperature is 20 to 120° C., preferably 30 to 70° C. When the polymerization temperature is lower than 20° C., the resulting latex generally has low stability. When the polymerization temperature is higher than 120° C., the polymerization tends to stall due to chain transfer. The polymerization is generally carried out under a pressure of 1.0 to 50 kgf/cm$^2$ (gauge pressure) for 5 to 100 hours, although the conditions depend on the kind of polymer as well.

As said fluorine-containing emulsifier to be used in the emulsion polymerization of seed particles, there may be mentioned one or a mixture of compounds containing fluorine atoms in their structure and having surface activity, for example acids represented by $X(CF_2)_nCOOH$ (wherein n represents an integer of 6 to 20 and X represents F or a hydrogen atom) and alkali metal salts, ammonium salts, amine salts or quaternary ammonium salts thereof; acids represented by $Y(CH_2CF_2)_mCOOH$ (wherein m represents an integer of 6 to 13 and Y represents F or a chlorine atom), alkali metal salts, ammonium salts, amine salts or quaternary ammonium salts thereof; and the like. More specifically, mention may be made of perfluorooctanoic acid ammonium salt, perfluorononanoic acid ammonium salt and the like. Other known fluorine-containing surfactants may also be used.

In the emulsion polymerization for obtaining seed particles, a nonionic fluorine-free surfactant may also be used in small amounts in the presence of a fluorine-containing surfactant. As concrete examples thereof, there may be mentioned polyoxyethylene alkyl ethers, polyoxyethylene alkylphenyl ethers, polyoxyethylene alkyl esters, sorbitan alkyl esters, polyoxyethylenesorbitan alkyl esters, glycerol esters and derivatives thereof, etc.

More specifically, the polyoxyethylene alkyl ethers include polyoxyethylene lauryl ether, polyoxyethylene cetyl ether, polyoxyethylene stearyl ether, polyoxyethylene oleyl ether, polyoxyethylene behenyl ether, etc., the polyoxyethylene alkylphenyl ethers include polyoxyethylene nonylphenyl ether, polyoxyethylene octylphenyl ether, etc., the polyoxyethylene alkyl esters include polyethylene glycol monolaurate, polyethylene glycol monooleate, polyethylene glycol monostearate, etc., the sorbitan alkyl esters include polyoxyethylenesorbitan monolaurate, polyoxyethylenesorbitan monopalmitate, polyoxyethylenesorbitan monostearate, polyoxyethylenesorbitan monooleate, etc., and the glycerol esters include glyceryl monomyristate, glyceryl monostearate, glyceryl monooleate, etc.

As the derivatives of these, polyoxyethylenealkylamines, polyoxyethylenealkylphenyl-formaldehyde condensates, polyoxyethylene alkyl ether phosphoric acid salts and the like. Particularly preferred are polyoxyethylene alkyl ethers and polyoxyethylene alkyl esters, with an HLB value of 10 to 18, specifically polyoxyethylene lauryl ether (EO: 5 to 20; EO with a numerical value indicating the number of ethylene oxide units) and polyethylene glycol monostearate (EO: 6 to 10).

The above-mentioned acrylic monomer to be used in the practice of the present invention is not particularly restricted but includes, among others, alkyl acrylates containing 1 to 18 carbon atoms in the alkyl moiety, alkyl methacrylates containing 1 to 18 carbon atoms in the alkyl moiety, and monomers having an ethylenically unsaturated bond copolymerizable with these.

As said alkyl acrylates containing 1 to 18 carbon atoms in the alkyl moiety, there may be mentioned, for example, methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, n-hexyl acrylate, t-butylcyclohexyl acrylate, stearyl acrylate and lauryl acrylate.

As said alkyl methacrylates containing 1 to 18 carbon atoms in the alkyl moiety, there may be mentioned, for example, methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, cyclohexyl methacrylate, n-hexyl methacrylate, tert-butylcyclohexyl methacrylate, stearyl methacrylate and lauryl methacrylate.

For the purpose of improving the solvent resistance and water resistance, a polyfunctional monomer such as ethylene glycol dimethacrylate or propylene glycol dimethacrylate may be used for copolymerization.

As the monomer having an ethylenically unsaturated bond copolymerizable with the acrylic ester and/or methacrylic ester mentioned above, there may be mentioned, among others, those mentioned below under (I) and (II).

(I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylol methacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as γ-trimethoxysilane methacrylate, γ-triethoxysilane methacrylate, etc.; aldehyde-containing monomers such as acrolein etc.; caprolactone-modified hydroxy acrylates, and caprolactone-modified hydroxy methacrylates.

(II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinic anhydride, crotonic acid, etc.; aromatic vinyl compounds such as styrene, α-methylstyrene, p-tert-butylstyrene, etc.; acrylonitrile, and the like.

Use may also be made, as the monomer having an ethylenically unsaturated bond copolymerizable with the acrylic ester and/or methacrylic ester mentioned above, of compounds containing, within the molecule thereof, a hydrophilic site-containing, low-molecular-weight polymer or oligomer. The hydrophilic site means a site having a hydrophilic group or a site having a hydrophilic bond, or a site comprising a combination of these. Said hydrophilic group may be an ionic, nonionic or amphoteric one or a combination of these. Nonionic or anionic hydrophilic groups are preferred, however. Any known reactive emulsifier may also be used as said monomer.

As said monomer having an ethylenically unsaturated bond copolymerizable with the acrylic ester and/or methacrylic ester mentioned above, or the reactive emulsifier, there may be mentioned, for example, polyethylene glycol methacrylate, polypropylene glycol methacrylate, methoxypolyethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol-polypropylene glycol monomethacrylate, polyethylene glycol-polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis (polyoxyethylene-polycyclic phenyl ether) methacrylated sulfuric acid ester salts, polyoxyethylene alkylphenyl ether acrylates, methacryloyloxypolyoxyalkylene sulfate salts, methacryloyl-oxyalkylene sulfate salts, polyoxyethylene vinyl ether, polyoxyethylene vinyl esters, and so on.

In the present invention, when the above acrylic monomer is subjected to seed polymerization in the presence of fluororesin particles, the fluororesin is first swelled with said acrylic monomer and, at this timepoint, an aqueous dispersion is formed with said acrylic monomer homogeneously dissolved therein. Then, upon addition of a polymerization initiator, said acrylic monomer polymerizes and compatibilized particles comprising molecule chains entangled together. In cases where said acrylic monomer is polyfunctional, an interpenetration network (IPN) structure can be formed. As the polyfunctional acrylic monomer, there may be mentioned monoglycol dimethacrylate, diglycol dimethacrylate and the like.

The seed polymerization of said acrylic monomer can be carried out by a per se known method, for example by the method comprising charging the whole amount of the acrylic monomer all at once into the reaction system in the presence of fluororesin particles, the method comprising charging a portion of the acrylic monomer, allowing the same to react and then charging the remaining portion either continuously or portionwise, or the method comprising charging the whole amount of the acrylic monomer continuously. The polymerization conditions for the above seed polymerization are the same as in ordinary emulsion polymerization, and the polymerization can be carried out, for example by adding a surfactant, a polymerization initiator and a chain transfer agent and, if necessary, a chelating agent, a pH-adjusting agent and a solvent, and so forth to an aqueous medium containing fluororesin particles and effecting the reaction at a temperature of 10 to 90° C. for 0.5 to 6 hours.

Usable as said surfactant are anionic or nonionic ones or combinations of anionic and nonionic ones. In some instances, amphoteric surfactants may be used as well.

As the anionic surfactants, there may be mentioned, for example, hydrocarbon-based anionic surfactants such as higher alcohol sulfate esters, sodium alkylsulfonates, sodium alkylbenzenesulfonates, succinic acid dialkyl ester, sulfonic acid sodium salts and alkyldiphenyl ether disulfonic acid sodium salts, and fluorine-containing anionic surfactants such as fluoroalkylcarboxylic acid salts, fluoroalkylsulfonic acid salts, and fluoroalkyl sulfate esters.

As the nonionic surfactants, there may be mentioned, for example, polyoxyethylene alkyl ethers, polyoxyethylene alkylphenyl ethers, polyoxyethylene alkyl esters, polyoxyethylene alkylphenyl esters, sorbitan alkyl esters, glycerol esters and derivatives thereof.

As said amphoteric surfactants, there may be mentioned, for example, laurylbetaine and the like.

As the surfactant mentioned above, the so-called reactive emulsifiers copolymerizable with the acrylic monomer can be used as well. Furthermore, such reactive emulsifiers may be used in combination with the emulsifiers mentioned above.

The surfactant is used generally in an amount of 0.05 to 5.0 parts by weight per 100 parts by weight of the acrylic monomer.

The polymerization initiator to be used in the above seed polymerization is not particularly restricted provided that it generates free radicals available for the free radical reaction in the aqueous medium at between 20 to 90° C. In some instances, the use thereof in combination with a reducing agent is also possible. As such, there may be mentioned polymerization initiators generally soluble in water, such as persulfuric acid salts and hydrogen peroxide, and reducing agents such as sodium pyrobisulfite, sodium hydrogen sulfite, sodium L-ascorbate, Rongalite and the like, and oil-soluble polymerization initiators such as diisopropyl peroxydicarbonate (IPP), benzoyl peroxide, dibutyl peroxide, azobisisobutyronitrile (AIBN) and so on.

Generally, the above polymerization initiator is used in an amount of 0.05 to 2.0 parts by weight per 100 parts by weight of the acrylic monomer.

As the chain transfer agent to be used in the above seed polymerization, there may be mentioned, for example, halogenated hydrocarbons such as chloroform and carbon tetrachloride; and mercaptans such as n-dodecylmercaptan, tert-dodecylmercaptan and n-octylmercaptan. Generally, said chain transfer agent is used in an amount of 0 to 5.0 parts by weight per 100 parts by weight of the acrylic monomer.

The solvent to be used in the above seed polymerization is used in an amount such that the processability, disaster prevention and safety, environmental friendliness and production safety will not be impaired, for example in an amount of not more than 20% by weight and, as examples thereof, there may be mentioned, for example, methyl ethyl ketone, acetone, trichlorotrifluoroethane, methyl isobutyl ketone, cyclohexanone, methanol, ethanol, propanol, butanol, ethylcellosolve, butylcellosolve, methylcarbitol, ethylcarbitol, butylcarbitol, dioxane, butylcarbitol acetate, thexanol, ethyl acetate, butyl acetate and the like.

The addition of such a solvent may improve the swellability of the fluororesin particles with the acrylic monomer in some instances.

In the present invention, the fluororesin particles in the aqueous medium preferably have a particle size of 50 to 300 nm, more preferably 50 to 200 nm.

When the particle size is less than 50 nm, the viscosity of the aqueous dispersion of a fluororesin markedly increases at a practical concentration range of not less than 30%, making troubles in paint making operation. When said particle size exceeds 300 nm, the resulting aqueous dispersion will have poor precipitation stability and, even when the resin constitution is of the same composition, a rise will result in the lowest film-forming temperature of the aqueous dispersion.

In addition to the aqueous dispersion (A-1) mentioned above in detail, the aqueous dispersion of the present invention also comprises the aqueous dispersion (A-2). Said aqueous dispersion (A-2) is an aqueous dispersion prepared without seed polymerization of acrylic resin.

Said aqueous dispersion (A-2) has a basic structure such that fluororesin particles are dispersed in an aqueous medium. The fluororesin constituting said fluororesin particles is a fluororesin (2) comprising a fluoroolefin copolymer or a fluororesin (1) comprising a copolymer of a fluoroolefin and a vinyl monomer. Said fluororesin (2) comprising a copolymer of a fluoroolefin is the same as that already described in relation to the aqueous dispersion.(A-1).

Said fluororesin (1) comprising a copolymer of a fluoroolefin and a vinyl monomer is preferably as follows.

As the fluoroolefin constituting said fluororesin (1), there may be mentioned fluoroolefins containing about 2 to 4 carbon atoms, such as vinyl fluoride (VF), vinylidene fluoride (VdF), tetrafluoroethylene (TFE), chlorotrifluoroethylene (CTFE), hexaf luoropropylene (HFP), trifluoroethylene (TrFE), etc.

As said vinyl monomer, there may be mentioned olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyls such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 (product of Shell), VEOVA 10 (product of Shell), etc.; and ethylenically unsaturated carboxylic acids such as itaconic anhydride, succinic anhydride, crotonic acid, etc., among others.

As said fluororesin (1) comprising a copolymer of a fluoroolefin and a vinyl monomer such as mentioned above, there may be mentioned CTFE/vinyl ether copolymers, CTFE/vinyl ester copolymers, TFE/vinyl ether copolymers, TFE/vinyl ester copolymers, TFE/ethylene copolymers, TFE/propylene copolymers, CTFE/ethylene copolymers, CTFE/propylene copolymers, CTFE/ethylene/vinyl ether copolymers, CTFE/ethylene/vinyl ester copolymers, and derivatives of these copolymers as modified with a small amount of a copolymerizable monomer.

For preparing the aqueous dispersion (A-2) mentioned above, mention may be made, for example, of the phase conversion method comprising preparing the fluororesin constituting fluororesin particles by polymerization in a solvent, for instance, and then dispersing said resin in water in the presence of an emulsifier, followed by distilling off the solvent, and the method comprising carrying out emulsion polymerization of the fluororesin constituting said fluororesin particles in an aqueous medium. For reducing the solvent and simplifying the process, the method comprising emulsion polymerization in an aqueous medium is preferred.

Said emulsion polymerization can be conducted in the same manner as in ordinary emulsion polymerization, for example by reacting a fluoroolefin and a monomer such as a monomer copolymerizable with the fluoroolefin in a closed vessel in an aqueous medium in the presence of a surfactant, a polymerization initiator and a chain transfer agent and, if necessary, a chelating agent, a pH-adjusting agent and a solvent, for instance, at a temperature of 10 to 90° C. for 0.5 to 40 hours.

Usable as said surfactant are anionic or nonionic ones or combinations of anionic and nonionic ones. In some instances, amphoteric surfactants may be used as well.

As the anionic surfactants, there may be mentioned, for example, hydrocarbon-based anionic surfactants such as higher alcohol sulfate esters, sodium alkylsulfonates, sodium alkylbenzenesulfonates, succinic acid dialkyl ester sulfonic acid salts and alkyldiphenyl ether disulfonic acid sodium salts, and fluorine-containing anionic surfactants such as fluoroalkylcarboxylic acid salts, fluoroalkylsulfonic acid salts, and fluoroalkyl sulfate esters.

As the nonionic surfactants, there may be mentioned, for example, polyoxyethylene alkyl ethers, polyoxyethylene alkylphenyl ethers, polyoxyethylene alkyl esters, polyoxyethylene alkylphenyl esters, sorbitan alkyl esters, glycerol esters and derivatives thereof.

As said amphoteric surfactants, there may be mentioned, for example, laurylbetaine and the like.

As the surfactant mentioned above, the so-called reactive emulsifiers can be used as well. Furthermore, such reactive emulsifiers may be used in combination with the emulsifiers mentioned above.

The polymerization initiator to be used in the above emulsion polymerization is not particularly restricted provided that it generates free radicals available for the free radical reaction in the aqueous medium at between 10 to 90° C. In some instances, the use thereof in combination with a reducing agent is also possible. As such, there may be mentioned polymerization initiators generally soluble in water, such as persulfuric acid salts and hydrogen peroxide, and reducing agents such as sodium pyrobisulfite, sodium hydrogen sulfite, sodium L-ascorbate, Rongalite and the like, and oil-soluble polymerization initiators such as diisopropyl peroxydicarbonate (IPP), benzoyl peroxide, dibutyl peroxide, azobisisobutyronitrile (AIBN) and so on.

As the chain transfer agent to be used in the above emulsion polymerization, there may be mentioned, for example, halogenated hydrocarbons such as chloroform and carbon tetrachloride; and mercaptans such as n-dodecylmercaptan, tert-dodecylmercaptan and n-octylmercaptan.

The solvent to be used in the above emulsion polymerization is used in an amount such that the processability, disaster prevention and safety, environmental friendliness and production safety will not be impaired, for example in an amount of not more than 20% by weight and, as examples thereof, there may be mentioned, for example, methyl ethyl ketone, acetone, trichlorotrifluoroethane, methyl isobutyl ketone, cyclohexanone, methanol, ethanol, propanol, butanol, ethylcellosolve, butylcellosolve, methylcarbitol, ethylcarbitol, butylcarbitol, dioxane, butylcarbitol acetate, thexanol, ethyl acetate, butyl acetate and the like.

The "aqueous dispersion" involved in the present invention has by now been fully described.

Repeatedly, it is to be noted that the fluororesin of the present invention may be a mixture of a fluororesin and some other resin, hence, when the "aqueous dispersion" illustrated above is used as one form of the fluorine-containing resin of the present invention, any of which the aqueous dispersion is, not only said aqueous dispersion per se but also a mixture with some other resin, preferably an acrylic resin, constitutes one form of the fluorine-containing resin of the present invention.

In the following, a further form of the fluorine-containing resin of the present invention, namely "resin solution", is described.

Said resin solution is a solution of the fluororesin of the invention in an organic solvent, and said fluororesin is an organic solvent-soluble fluororesin.

Said organic solvent-soluble fluororesin is a polymer soluble in an organic solvent as selectable from among the previously mentioned fluororesins (1) comprising a copolymer of a fluoroolefin and a vinyl monomer, the fluororesins (2) which are fluoroolefin copolymers, and the fluororesins (3) comprising a fluoroolefin homopolymer.

As preferred examples of said organic solvent-soluble fluororesin, there may be mentioned, for example, fluoroolefin copolymers. As the fluoroolefins, there may be mentioned three species, namely VdF, TFE and CTFE. Said fluoroolefin in copolymer thus includes, among others, VdF/TFE copolymers, VdF/CTFE copolymers, TFE/CTFE copolymers and VdF/TFE/CTFE copolymers.

As said organic solvent-soluble fluororesin, there may be mentioned, in addition to those mentioned above, fluoroolefin homopolymers, fluoroolefin in copolymers other than those mentioned above, copolymers of a fluoroolefin and some other monomer, and so on. These are not particularly restricted but include, for example, VdF homopolymers, TrFE homopolymers, TFE homopolymers, CTFE homopolymers, HFP homopolymers, VdF/TrFE copolymers, VdF/VF copolymers, VdF/HFP copolymers, TFE/TrFE copolymers, TFE/VF copolymers, TFE/HFP copolymers, CTFE/TrFE copolymers, CTFE/VF copolymers, CTFE/HFP copolymers, VdF/TFE/TrFE copolymers, VdF/TFE/VF copolymers, VdF/TFE/HFP copolymers, VdF/CTFE/TrFE copolymers, VdF/CTFE/VF copolymers, VdF/CTFE/HFP copolymers, TFE/CTFE/TrFE copolymers, TFE/CTFE/VF copolymers, TFE/CTFE/HFP copolymers, etc.

Among them, VdF-based copolymers using VdF as an essential monomer, namely copolymers of VdF and another monomer or other monomers, are preferred. For increasing the solubility in an organic solvent, those containing 50 to 90 mole percent of VdF, 5 to 30 mole percent of TFE and 5 to 30 mole percent of CTFE and those containing 50 to 90 mole percent of VdF, 5 to 30 mole percent of TFE and 5 to 30 mole percent of HFP are more preferred.

The above organic solvent-soluble fluororesin can be prepared by polymerizing the monomer or monomers such as mentioned above by an ordinary method of polymerization. As such method of polymerization, there may be mentioned, for example, those methods mentioned above in detail in relation to the polymerization for the fluororesins constituting seed particles under the section describing the aqueous dispersion of a fluororesin prepared by seed polymerization of an acrylic resin.

Said organic solvent is not particularly restricted but, from the solubility viewpoint, ketones or esters having a boiling point of about 60 to 250° C. are particularly preferred. As examples thereof, there may be mentioned, for example, acetone, methyl ethyl ketone, methyl i-butyl ketone, cyclohexanone, ethyl acetate, n-butyl acetate, methylcellosolve acetate and the like. These may be used singly or two or more of them may be used in combination. In addition to these, tetrahydrofuran (THF), dimethylformamide (DMF) and the like may also be mentioned as said organic solvent. Furthermore, aromatic organic compounds such as toluene and xylene, or alcohols may be added thereto. These organic solvents can favorably dissolve the above-mentioned organic solvent-soluble fluorine-containing resins to give compositions with a wide range of concentration, from low to high, whereby the durable water repellent agents acquire excellent durability.

The "resin solution" of the invention has by now been fully described.

Repeatedly, it is to be noted that the fluororesin of the present invention may be a mixture of a fluororesin and some other resin, hence, when the "resin solution" illustrated above is used as one form of the fluorine-containing resin of the present invention, any of which the resin solution is, not only said resin solution but also a mixture with some other resin, preferably an acrylic resin, constitutes one form of the fluorine-containing resin of the present invention.

While the fluororesin of the present invention has been described above in general, a supplemental description is now made of the fluororesin (1) which comprises a copolymer of a fluoroolefin and a vinyl monomer, among those fluororesins constituting the fluorine-containing resins of the present invention.

More preferred as the fluororesin (1) comprising a copolymer of a fluoroolefin and a vinyl monomer among the fluororesins of the present invention invention is a fluororesin (1a) comprising a copolymer of a fluoroolefin and a specific vinyl monomer.

The fluoroolefin constituting said copolymer with a specific vinyl monomer is represented by the formula:

$$CF_2=CFX$$

(wherein X represents a hydrogen atom, a fluorine atom, a chlorine atom or a trifluoromethyl group.) As preferred examples of such fluoroolefin, there may be mentioned TFE, CTFE, TrFE and HFP. TFE is preferred, however, since it makes possible for the durable water repellent agent of the present invention to be chlorine-free and form highly durable and tough films and to have an increased fluorine content, hence increased water repellency.

As the specific vinyl monomer to copolymerize with said fluoroolefin, there are three species, namely (i) a β-methyl-β-alkyl-substituted α-olefin, (ii) a vinyl-containing ether and (iii) a vinyl-containing ester. One of these species (i), (ii) and (iii), upon copolymerization with the above-mentioned fluoroolefin, forms the fluororesin (3) mentioned above. It is also possible to use two or more of said species and, furthermore, those cases in which they are carboxyl-containing vinyl monomers or vinyl monomers containing a curing reaction site such as a hydroxyl, epoxy, silyl or like group are preferred. In cases where they have no carboxyl group or no curing reaction site, a carboxyl-containing vinyl monomer or a vinyl monomer having a hydroxyl, epoxy, silyl or like curing reaction site group may preferably be mentioned as said specific vinyl monomer to be copolymerized with said fluoroolefin in addition to the vinyl monomers mentioned above.

The above-mentioned β-methyl-β-alkyl-substituted-α-olefin (i) is represented by the formula:

$$CH_2=CR^0(CH_3)$$

(wherein $R^0$) represents an alkyl group containing 1 to 8 carbon atoms). Such is not particularly restricted but includes, among others, isobutylene, 2-methyl-1-butene, 2-methyl-1-pentene and 2-methyl-1-hexene. Among them, isobutylene is preferred, however.

The proportion of the above-mentioned β-methyl-β-alkyl-substituted-α-olefin (i) in the copolymer of the fluoroolefin mentioned above and said specific vinyl monomer is preferably 5 to 45% by weight. When it is less than 5% by weight, the weather resistance of the durable water repellent agent of the present invention will be inferior. When it is above 45% by weight, it becomes difficult to prepare said copolymer.

The vinyl-containing ether (ii) mentioned above is an alkyl vinyl ether or alkyl allyl ether representable by the formula:

$$CH_2=CHR$$

(wherein R represents $OR^{11}$ or $CH_2OR^{11}$ (in which $R^{11}$ represents an alkyl group containing 1 to 8 carbon atoms)) and, when it contains a hydroxyl group and occurs as a hydroxyalkyl vinyl ether or hydroxyalkyl allyl ether (in this case, $R^{11}$ is a hydroxyl-containing alkyl group), said hydroxyl group favorably functions as a reaction site with the curing agent to be mentioned later herein.

The vinyl-containing ether (ii) mentioned above is not particularly restricted but may be, for example, ethyl vinyl ether, butyl vinyl ether, hexyl vinyl ether, cyclohexyl vinyl ether, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydoxyethyl allyl ether, 4-hydroxybutyl allyl ether, glycerol monoallyl ether and the like.

The content of the above vinyl-containing ether (ii) in the copolymer of the above-mentioned fluoroolefin and the specific vinyl monomer is preferably 1 to 45% by weight. When it is less than 1% by weight, the durable water repellent agent of the present invention will have poor curability. When it is above 45% by weight, gelation tends to occur, causing poor storage stability, and the resulting coat films will be fragile. A more preferred content range is 1 to 30% by weight, still more preferably 5 to 15% by weight.

The vinyl-containing ester (iii) mentioned above is represented by the formula:

$$CHR^{21}=CHR^{31}$$

(wherein $R^{21}$ represents a hydrogen atom or $COOR^{41}$, $R^{31}$ represents $COOR^{41}$ or $OCOR^{41}$, and $R^{41}$ represents an alkyl group containing 1 to 10 carbon atoms, a cycloalkyl group containing 3 to 10 carbon atoms, a fluoroalkyl group containing 1 to 10 carbon atoms or a phenyl group which may optionally be substituted by an alkyl group containing 1 to 8 carbon atoms. When $R^{31}$ is $OCOR^{41}$, $R^{31}$ is a hydrogen atom.) More specifically, there may be mentioned vinyl carboxylates of the formula:

$$CH_2=CH(OCOR^{41})$$

and maleic acid diesters or fumaric acid diesters of the formula:

$$(R^{41}OOC)CH=CH(COOR^{41})$$

The vinyl carboxylates mentioned above are not particularly restricted but include, among others, vinyl acetate, vinyl propionate, vinyl butyrate, vinyl isoburyrate, vinyl pivalate, vinyl caproate, vinyl versatate, vinyl laurate, vinyl stearate, vinyl benzoate, vinyl p-t-butylbenzoate, vinyl salicylate, vinyl cyclohexanecarboxylate, vinyl hexafluoropropionate, vinyl trichloroacetate and the like. The maleic acid diester or fumaric acid diester mentioned is not particularly restricted but includes, among others, dimethyl maleate, diethyl maleate, dipropyl maleate, dibutyl maleate, diphenyl maleate, dibenzyl maleate, ditrityl maleate, ditrifluoromethyl maleate, ditrifluoroethyl maleate, dihexafluoropropyl maleate, dimethyl fumarate, diethyl fumarate, dipropyl fumarate, dibutyl fumarate, diphenyl fumarate, dibenzyl fumarate, ditrityl fumarate, ditrifluoromethyl fumarate, ditrifluoroethyl fumarate, dihexafluoropropyl fumarate, etc.

The content of the above vinyl-containing ester (iii) in the copolymer of the fluoroolefin and specific vinyl monomer mentioned above is preferably 1 to 45% by weight. When it is less than 1% by weight, the solubility and compatibility will be poor and the glass transition temperature will be low. If it is above 45% by weight, a deterioration in weather resistance will be caused. More preferably, said content is 5 to 40% by weight, most preferably 10 to 30% by weight.

The carboxyl-containing vinyl monomer already mentioned above as a specific vinyl monomer other than (i), (ii) or (iii) improves the dispersibility and curing reactivity of the fluorine-containing resin of the present invention and the adhesiveness of the durable water repellent agent of the present invention to substrates, among others. As said carboxyl-containing vinyl monomer, there may be mentioned, for example, those derived from crotonic acid, maleic acid, acrylic acid, methacrylic acid, itaconic acid, vinyl acetate and the like. The content of said carboxyl-containing vinyl monomer in the total of the vinyl monomers is preferably 0.01 to 10 mole percent. If it is too low, the compatibility with the curing agent will be low and, if it is too high, the water resistance will be decreased.

The curing reaction site-containing vinyl monomer already mentioned above as a specific vinyl monomer other than (i), (ii) or (iii) includes those in which said curing reaction site is a hydroxyl group, epoxy group or silyl group. As the vinyl monomer in which the curing reaction site is a hydroxyl group, there may be mentioned hydroxyalkyl vinyl ethers, hydroxyalkyl vinyl esters and the like, such as mentioned above in relation to (ii).

As vinyl monomers having another curing reaction site, there may be mentioned, for example, those epoxy-containing vinyl monomers described in Japanese Kokai Publication Hei-02-232250 and Hei-02-232251, those silyl-containing vinyl monomers described in Japanese Kokai Publication Sho-61-141713, for instance.

As said epoxy-containing vinyl monomers, there may be mentioned, for example, those epoxy vinyl compounds or epoxy vinyl ethers represented by the following general formula:

$$CH_2=CH-R^{53}-R^{54}$$

$$CH_2=CH-R^{53}-R^{54}$$

(In the formula, $R^{53}$ represents $-CH_2-O-R^{55}$,

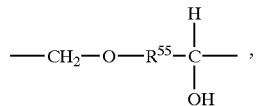

$-O-R^{55}-$, or $-R^{55}-$ (wherein $R^{55}$ represents an alkyl group.)

$R^{54}$ is

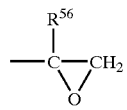

(wherein $R^{56}$ represents a hydrogen atom or an alkyl group)

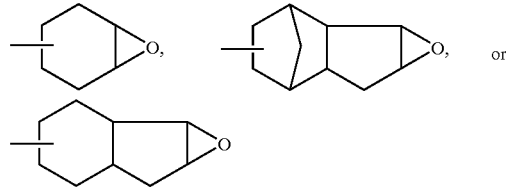

As typical examples of these, there may be mentioned the following:

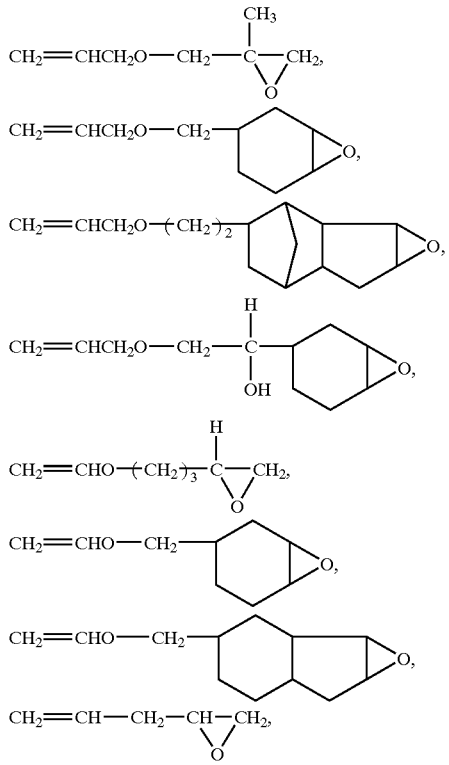

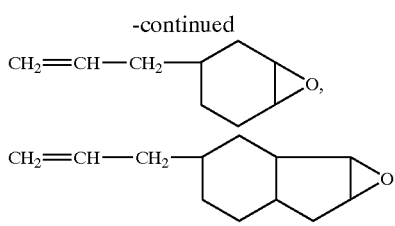

Typical examples of the silyl-containing vinyl monomer mentioned above are vinyltrimethoxysilane, vinyltriethoxysilane, vinyltripropoxysilane, vinylmethyldimethoxysilane, vinyldimethylmethxoysilane, vinylmethyldiethoxysilane, vinyltris(β-methoxy)silane, trimethoxysilylethyl vinyl ether, triethoxysilylethyl vinyl ether, trimethoxysilylbutyl vinyl ether, trimethoxysilylethyl vinyl ether, trimethoxysilylpropyl vinyl ether, triethoxysilylpropyl vinyl ether, vinyltriisopropenyloxysilane, vinylmethyldiisopropenyloxysilane, triisopropenyloxysilylethyl vinyl ether, triisopropenyloxysilylpropyl vinyl ether, triisopropenyloxysilylbutyl vinyl ether, vinyltris(dimethyliminoxy)silane, vinyltris-(methylethyliminoxy)silane, vinylmethylbis(methyl-dimethyliminoxy)silane, vinyldimethyl(dimethyl-iminoxy)silane, tris(dimethyliminoxy)silylethyl vinyl ether, methylbis(dimethyliminoxy)silylethyl vinyl ether, tris(dimethyliminoxy)silylbutyl vinyl ether, γ-(meth)acryloyloxypropyltrimethoxysilane, γ-(meth)acryloyloxypropyltriethoxysilane, γ-(meth)-acryloyloxypropylmethyldimethoxysilane, γ-(meth)-acryloyloxypropyltriisopropenyloxysilane, γ-(meth)-acryloyloxypropyltris(dimethyliminoxy)silane, γ-(meth)acryloyloxypropyltris(dimethyliminoxy)silane, allyltrimethoxysilane and so forth.

The content of said vinyl monomer containing a curing reaction site in the total of the vinyl monomers is not particularly defined but preferably is 5 to 15 mole percent. If it is too low, the curability will be insufficient. If it is too high, gelation tends to occur and the storage stability will be reduced.

The copolymer of the fluoroolefin and specific vinyl monomer mentioned above can be prepared by polymerizing said monomers by a conventional method of polymerization. As such method of polymerization, there may be mentioned, for example, those methods described above in detail in relation to the polymerization of the fluororesin constituting seed particles under the section of aqueous dispersion of a fluororesin (A-1) resulting from seed polymerization of an acrylic resin.

The explanation of the fluorine-containing resin of the present invention has now completed. The description so far made is summarized below.

(1) The fluorine-containing resin of the present invention derives from an aqueous dispersion or dissolving in a solvent.
(2) The fluorine-containing resin of the present invention comprises a fluororesin or a mixture of a fluororesin and some other resin.
(3) Other resin constituting the fluorine-containing resin of the present invention is preferably an acrylic resin.
(4) One of the fluororesins constituting the fluorine-containing resins of the present invention is a copolymer of a fluoroolefin and a vinyl monomer. In this case as well, said fluorine-containing resin comprises either a fluororesin or a mixture of a fluororesin and some other resin (in particular an acrylic resin).
(5) One of the fluororesins constituting the fluorine-containing resins of the present invention is a copolymer of fluoroolefins. In this case, too, said fluorine-containing resin comprises either a fluororesin or a mixture of a fluororesin and some other resin (in particular an acrylic resin).
(6) In the above case (5), said copolymer of fluoroolefins is preferably a copolymer of vinylidene fluoride and a fluoroolefin other than vinylidene fluoride. In this case, too, said fluorine-containing resin comprises either a fluororesin or a mixture of a fluororesin and some other resin (in particular an acrylic resin).
(7) In the above case (6), the fluorine-containing resin is preferably in the form of an aqueous dispersion. In this case, too, said fluorine-containing resin comprises either a fluororesin or a mixture of a fluororesin and some other resin (in particular an acrylic resin).
(8) In the above case (7), the fluorine-containing resin is preferably a fluororesin prepared by seed polymerization of an acrylic resin. In this case, too, said fluorine-containing resin comprises a fluororesin or a mixture of a fluororesin and some other resin (in particular an acrylic resin).

The constitution of the fluorine-containing resin has by now been fully described. In cases where the fluorine-containing resin of the present invention has a curing reaction site, a curing agent capable of reacting with said curing reaction site may be added as desired for the purpose of improving the durability and solvent resistance of the coat film formed from the durable water repellent agent of the present invention. Said curing agent is not particularly restricted but includes, for example, isocyanate-based curing agents, melamine-based curing agents and the like.

Since the description of the repellent and fluorine-containing resin, two constituent elements of the durable water repellent agent of the present invention has been completed, the proportions of these are now described.

In the present invention, the proportions of said repellent and said fluorine-containing resin are such that the ratio (repellent):(fluorine-containing resin) on the solid weight basis amounts to 50:50 to 99:1. The repellent accounts for 50 to 99 parts per 100 parts of the total solids. When its amount is less than 50 parts by weight, sufficient water repellency and natural woody feel of wood or unique feel of cloths cannot be attained. When it exceeds 99 parts by weight, the durability will be poor. A more preferred range is 60 to 97 parts by weight, most preferably 70 to 95 parts by weight.

In preparing the durable water repellent agent of the present invention, appropriate additives may be incorporated in addition to the constituents mentioned above. Such additives are not particularly restricted but include, for example, pigments, preservatives, antibacterial agents, antifungal agents, fire retardants, surface modifiers, curing catalysts, viscosity modifiers, leveling agents, ultraviolet absorbers, antiskinning agents, dispersants, antifoams, organosilicon compounds and like known additives in general use. The amounts of addition of these are not particularly restricted, either, but respective ordinary addition amounts can be employed.

When a preservative, an antibacterial agent and/or an antifungal agent is added as the additive mentioned above, the durable water repellent agent of the present invention can simultaneously produce its effects as a preservative or antifungal paint film. Said composition may further be applied as a water absorption preventing agent, a muddy water stain preventing agent or the like, depending on the kind of additive.

In applying the durable water repellent agent of the present invention to substrates, an ordinary method of application can suitably be employed, for example spray coating, brush coating or the like method.

The target substrates of the durable water repellent agent of the present invention are not particularly restricted but preferably include those which contain moisture and of which a high level of durability as resulting from application of the water repellent composition is required. Since the durable water repellent agent of the present invention has excellent durability in its water repelling effect, said composition is suited for application, for example, in those fields of use where water repellency is required to be maintained in an ultraviolet irradiation environment, for example for application to cloths for tents, curtains, rolling blinds, umbrellas, etc.; wood materials for benches, fences, walls, etc.; and concrete for buildings etc. However, the targets of application of the durable water repellent agent of the present invention are not limited to those mentioned above but said composition can of course be used for increasing the water repellency of various other substrates.

Since the durable water repellent agent of the present invention is effective against acid rain as well, it is also useful for substrates having a high possibility of being used outdoors and exposed to wind and rain. As such, there may be mentioned, for example, external walls of houses, outer walls of buildings, windowpanes, automotive bodies, etc.

A coated article produced by application of the durable water repellent agent of the present invention also constitutes an aspect of the present invention. For the reasons mentioned above, said coated article includes various articles, for example articles whose surface is porous. As such articles having a porous surface, there may be mentioned concrete, wood, cloths and so forth, preferably concrete.

Considering the fact that the excellent effects of the durable water repellent agent of the present invention are produced mainly at places where concrete structures contact with the outside, it is also possible to coat said concrete structures with the durable water repellent agent of the present invention, for example at surface portions of the concrete structures already built up.

Concrete coated with the durable water repellent agent of the present invention has excellent durable water repelling effects and, therefore, are useful in those fields in which this feature can be positively utilized. For example, such fields include blocks for flood protection, cooling water inlet canals, water tanks for fish culture, water-storing tanks and the like, which are always in contact with water; nuclear power plant equipment for which durability is very important; bathtubs and watercourses in hot springs and the like which are in contact with acidic water; sidewalks, parks, recreation parks, school grounds and school pools, and pavement blocks, which are subject to adhesion of gum and other sticky substances; hall roof trussses, hall beams, bridges, railway crossties, building floors, building walls, building pillars, roof structures, mineral oil storage tanks, prefabricated garages, prefabricated houses, concrete tiles, U-shaped stones for construction works, car body supporting floors, and other molded articles. Said composition can be utilized in coating these themselves or surfaces thereof.

BEST MODES FOR CARRYING OUT THE INVENTION

The following examples illustrate the present invention in further detail. They are, however, by no means limitative of the scope of the invention.

Repellent

Unidine TG-652 (product of Daikin Industries), Unidine TG-410 (product of Daikin Industries), Unidine TG-101 (product of Daikin Industries), ethyltriethoxysilane (designated by "EES" in Table 1 and Table 2), and Tightsilane (product of Toyo Ink Manufacturing) were used.

Fluorine-containing Resin

SYNTHESIS EXAMPLE 1

A one-liter pressure reaction vessel equipped with a stirrer was charged with 500 milliliters of deionized water, 0.5 g of ammonium perfluorooctanoate and 0.05 g of polyoxyethylene monostearate (POE 40), the process for introducing nitrogen under pressure and degassing was repeated to thereby remove dissolved oxygen, and then pressurization was carried out with a monomer mixture of VdF/TFE/CTFE (74/14/12 by mole percent) to 10 kgf/cm$^2$ at 60° C. Then, 0.2 g of ammonium persulfate was added and, while continuously feeding the monomer mixture of VdF/TFE/CTFE (74/14/12 by mole percent) in a manner such that the vessel inside pressure was maintained constant at 10 kgf/cm$^2$, the reaction was carried out for 30 hours. Thereafter, the vessel was returned to ordinary temperature and ordinary pressure, whereby an aqueous copolymer dispersion was obtained, This is referred to as "aqueous copolymer dispersion S".

SYNTHESIS EXAMPLE 2

A 200-ml four-necked flask equipped with a stirrer, a condenser and a thermometer was charged with 100 g of "aqueous copolymer dispersion S" obtained in Synthesis Example 1, and an alkyl allyl sulfosuccinate alkali salt (Eleminol JS2; product of Sanyo Chemical Industries) was added thereto in an amount of 1.0% relative to the solid content. The flask contents were heated on a water bath with stirring and, when the vessel temperature reached 80° C., an emulsion prepared by emulsifying a monomer mixture composed of 13.0 g of methyl methacrylate (MMA), 3.5 g of butyl acrylate (BA) and 2.2 g of polyoxyethylene methacrylate (POEMA; trademark M90G, product of Shin Nakamura Kagaku Kogyo) with a 0.5% aqueous solution of the alkyl allyl sulfosuccinate alkali salt was added dropwise over 1 hour. Immediately thereafter, the reaction was started by adding 1 milliliter of a 2% aqueous solution of ammonium persulfate. At 3 hours after initiation of the reaction, the vessel temperature was raised to 85° C., this temperature was maintained for 1 hour and, then, the reaction mixture was cooled, adjusted to pH 7 with aqueous ammonia, and filtered through a 300-mesh wire gauze to give a blue-white aqueous dispersion of a fluorine-containing seed polymer. This is referred to as "emulsion S".

SYNTHESIS EXAMPLE 3

A fluororesin recovered from "aqueous copolymer dispersion S" obtained in Synthesis Example 1 by drying and washing and a methyl methacrylate homopolymer with a number average molecular weight of 15,000 were dissolved, in a solid weight ratio of 70:30, in butyl acetate with stirring, to give a fluororesin-acrylic resin mixture. This was used in Examples under the designation "A".

SYNTHESIS EXAMPLE 4

An aqueous resin dispersion was prepared by adding 5% by weight of diethyl adipate, as a film-forming auxiliary, to "emulsion S" obtained in Synthesis Example 2. This was used in Examples under the designation "B".

SYNTHESIS EXAMPLE 5

A 200-milliliter stainless autoclave equipped with a stirrer was charged with 17.8 g of cyclohexyl vinyl ether (CHVE), 4.2 g of polyoxyethylene allyl ether (POEAE; trademark PKA 5003, product of Nippon Fat and Oil), 6.1 g of ethyl vinyl ether (EVE), 66.1 g of deionized water, 0.3 g of ammonium perfluorooctanoate (emulsifier), 0.35 g of potassium carbonate, 0.02 g of sodium hydrogen sulfite and 0.08 g of ammonium persulfate (initiator), cooled with ice, and pressurized to 3.5 kgf/cm$^2$ with nitrogen gas, followed by degassing. After two repetitions of this pressurization and degassing procedure, followed by degassing to 10 mmHg, to thereby remove dissolved oxygen, 27.5 g of chlorotrifluoroethylene (CTFE) was charged, and the reaction was carried out at 30° C. for 12 hours, whereby an aqueous dispersion of fluorine-containing polymer was obtained. To this was added diethyl adipate as a film-forming auxiliary in an amount of 5% by weight on the solid basis, to give an aqueous resin dispersion. This was used in Examples under the designation "D".

SYNTHESIS EXAMPLE 6

A copolymer of a hydroxyl-containing fluororesin (Zeffle GK510, product of Daikin Industries) dissolved in an organic solvent with tetrafluoroethylene and a vinyl monomer was synthesized and then admixed with a curing agent (trademark Coronate HX, product of Nippon Polyurethane), the hydroxyl group-to-isocyanato group ratio (hydroxyl/isocyanato) being adjusted to 1/1. This was used in Examples under the designation "C".

SYNTHESIS EXAMPLE 7

A hydroxyl-containing acrylic resin dissolved in an organic solvent (Acrydic A-801, product of Dainippon Ink and Chemical) was admixed with a curing agent (trademark Coronate HX, product of Nippon Polyurethane), the hydroxyl group-to-isocyanato group ratio (hydroxyl/isocyanato) being adjusted to 1/1. This was used in Examples under the designation "E". Although this is not a fluorine-containing resin, it was used in Comparative Examples in lieu of a fluorine-containing resin and, therefore, it is referred to, in Table 1 and Table 2, as "fluorine-containing resin E" for convenience.

SYNTHESIS EXAMPLE 8

A four-necked flask was charged with 3 weight parts of sodium lauryl sulfonate and 160 weight parts of deionized water. The temperature was raised to 60° C. in a nitrogen stream, then 0.5 weight part of ammonium persulfate and 0.2 weight part of sodium hydrogen sulfite were added, and 100 weight parts of a mixture of methyl methacrylate/ethyl methacrylate/n-butyl methacrylate=63/30/7 (mole percent) was added dropwise over 3 hours. The temperature during dropping was controlled to 60 to 70° C.

After completion of the dropping, stirring was still continued for 2 hours within the same temperature range, followed by cooling. The pH was then adjusted to 8 to 9 with 15% aqueous ammonia, to give a stable emulsion with a solid content of 30%. This is referred to as "acrylic emulsion".

SYNTHESIS EXAMPLE 9

To "acrylic emulsion" obtained in Synthesis Example 8 was added diethyl adipate as a film-forming auxiliary in an amount of 5% by weight on the solid basis, to give an aqueous resin dispersion. This was used in Examples under the designation "F". Although this is not a fluorine-containing resin, it was used in Comparative Examples in lieu of a fluorine-containing resin and, therefore, it is referred to, in Table 1 and Table 2, as "fluorine-containing resin F" for convenience.

EXAMPLES AND COMPARATIVE EXAMPLES

Durable water repellent agents of the present invention were prepared by admixing the repellents and fluorine-containing resins in respective ratios (solid parts by weight) shown in Table 1 and Table 2.

Concrete and wood were employed as substrates. Each durable water repellent agent was applied to the surface of each substrate in an amount (as solids) of 5 g/m$^2$ and then odor, water contact angle, water running test and acid resistance test results were obtained as mentioned below. Thereafter, the test specimens were subjected to SWOM (sunshine weather-o-meter) testing for 1,500 hours and then water contact angle and water running test results were obtained in the same manner. The results are shown in Table 1 and Table 2.

Odor Upon Application

The substrate surface immediately after application was smelled for odor evaluation.

⊚: Little odorous;

○: A little odorous but not offensive;

Δ: Odorous; long-time inhalation at a place of poor ventilation makes one feel sick;

X Short-time inhalation at a place of poor ventilation makes one feel sick.

Measurement of Angle of Contact with Water

The measurement was made by the droplet method using a Kyowa Kaimen Kagaku model CA-DT measuring device.

Water Running Test

Distilled water was allowed to fall from a height of 20 cm for 1 minute at a rate of 1,000 ml/min perpendicularly upon each coated test specimen, then the specimen was allowed to stand at an incline of 45° for 1 minute, and the coat surface was observed by the eye for appearance and evaluated according to the following criteria:

⊚: Water running down;

○: Water running down, but a small number of water droplets remaining;

○Δ: Water forming balls but the water ball rolling down to a lesser extent;

Δ: Water forming balls but the water balls remaining adhering;

X: Water forming no balls and the surface becoming wet-colored.

Acid Resistance Test

Coated test specimens were immersed in 2% sulfuric acid for 7 days. The coated surface was observed by eye for a change in appearance.

TABLE 1

| | | Example | | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| kind of substrate | | Concrete | | | | | | | | | | | | | | Wood | | | |
| Repellent (weight part) | TG-652 | 60 | 60 | 80 | 80 | 0 | 0 | 0 | 0 | 0 | 0 | 80 | 80 | 0 | 0 | 80 | 80 | 0 | 0 |
| | TG-410 | 0 | 0 | 0 | 0 | 80 | 80 | 80 | 80 | 0 | 0 | 0 | 0 | 60 | 60 | 0 | 0 | 80 | 80 |
| | TG-101 | 0 | 0 | 0 | 0 | 0 | 0 | 0 | 0 | 80 | 80 | 0 | 0 | 0 | 0 | 0 | 0 | 0 | 0 |
| | EES | 0 | 0 | 0 | 0 | 0 | 0 | 0 | 0 | 0 | 0 | 0 | 0 | 0 | 0 | 0 | 0 | 0 | 0 |
| | Tight silane | 0 | 0 | 0 | 0 | 0 | 0 | 0 | 0 | 0 | 0 | 0 | 0 | 30 | 30 | 0 | 0 | 0 | 0 |
| Fluorine-containing resin (weight parts) | A | 40 | 40 | 20 | 20 | 0 | 0 | 0 | 0 | 0 | 0 | 0 | 0 | 0 | 0 | 20 | 20 | 0 | 0 |
| | B | 0 | 0 | 0 | 0 | 20 | 20 | 0 | 0 | 20 | 20 | 0 | 0 | 10 | 10 | 0 | 0 | 20 | 20 |
| | C | 0 | 0 | 0 | 0 | 0 | 0 | 0 | 0 | 0 | 0 | 20 | 20 | 0 | 0 | 0 | 0 | 0 | 0 |
| | D | 0 | 0 | 0 | 0 | 0 | 0 | 20 | 20 | 0 | 0 | 0 | 0 | 0 | 0 | 0 | 0 | 0 | 0 |
| | E | 0 | 0 | 0 | 0 | 0 | 0 | 0 | 0 | 0 | 0 | 0 | 0 | 0 | 0 | 0 | 0 | 0 | 0 |
| | F | 0 | 0 | 0 | 0 | 0 | 0 | 0 | 0 | 0 | 0 | 0 | 0 | 0 | 0 | 0 | 0 | 0 | 0 |
| Initial | Odor upon application | Δ | Δ | Δ | Δ | ○ | ○ | ○ | ○ | ○ | ○ | Δ | Δ | ○ | ○ | Δ | Δ | ○ | ○ |
| | Water contact angle (°) | 136 | 136 | 139 | 139 | 135 | 135 | 134 | 134 | 134 | 134 | 137 | 137 | 138 | 138 | 135 | 135 | 127 | 127 |
| | Water running test | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | 7 days of immersion in 2% $H_2SO_4$ | none | exist | none | exist | none | exist | none | exist | none | exist | none | exist | none | exist | none | exist | none | exist |
| After 1500 hours in SWOM | Water contact angle (°) | 127 | 126 | 134 | 132 | 130 | 128 | 126 | 93 | 128 | 129 | 132 | 110 | 134 | 131 | 112 | 113 | 112 | 110 |
| | 7 days of immersion in 2% $H_2SO_4$ | ◎ | ◎ | ◎ | ◎ | ◎ | ◎ | ◎ | ○Δ | ◎ | ◎ | ◎ | ○ | ◎ | ◎ | ○ | ○ | ○ | ○ |

TABLE 2

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Kind of substrate | | Concrete | | | | | | | | Wood | |
| Repellent (weight parts) | TG-652 | 100 | 0 | 0 | 0 | 0 | 0 | 80 | 0 | 100 | 80 |
| | TG-410 | 0 | 100 | 0 | 0 | 0 | 80 | 0 | 0 | 0 | 0 |
| | TG-101 | 0 | 0 | 100 | 0 | 0 | 0 | 0 | 0 | 0 | 0 |
| | EES | 0 | 0 | 0 | 100 | 0 | 0 | 0 | 0 | 0 | 0 |
| | Tightsilane | 0 | 0 | 0 | 0 | 100 | 0 | 0 | 0 | 0 | 0 |
| Fluorine-containing resin (weight parts) | A | 0 | 0 | 0 | 0 | 0 | 0 | 0 | 0 | 0 | 0 |
| | B | 0 | 0 | 0 | 0 | 0 | 0 | 0 | 0 | 0 | 0 |
| | C | 0 | 0 | 0 | 0 | 0 | 0 | 0 | 0 | 0 | 0 |
| | D | 0 | 0 | 0 | 0 | 0 | 0 | 0 | 0 | 0 | 0 |
| | E | 0 | 0 | 0 | 0 | 0 | 0 | 20 | 100 | 0 | 20 |
| | F | 0 | 0 | 0 | 0 | 0 | 20 | 0 | 0 | 0 | 0 |
| Initial | Odor upon application | ○ | ◎ | ○ | ○ | ◎ | ◎ | Δ | X | ○ | Δ |
| | Water contact angle (°) | 131 | 130 | 128 | 128 | 120 | 120 | 127 | 73 | 131 | 122 |
| | Water running test | ◎ | ◎ | ◎ | ◎ | ◎ | ◎ | ◎ | ○Δ | ◎ | ◎ |
| | 7 days of immersion in 2% $H_2SO_4$ | none | none | none | none | none | none | none | none | none | none |
| After 1500 hours in SWOM | Water contact angle (°) | 56 | 52 | 48 | 23 | 20 | 15 | 23 | 15 | 53 | not more than 10 |
| | 7 days of immersion in 2% $H_2SO_4$ | Δ | Δ | Δ | X | X | X | X | X | Δ | X |

INDUSTRIAL APPLICABILITY

The durable water repellent agent of the present invention, which is constituted as mentioned above, is excellent in water repellency, retains its water repelling property for a prolonged period of time, has an excellent, long-lasting water repelling effect especially upon substrates having a porous surface, such as concrete, wood, cloths and the like. It can maintain the natural feel or unique feel of concrete, wood and cloths.

What is claimed is:

1. A durable water repellent agent comprising a repellent and a fluorine-containing resin, wherein the repellent comprises a perfluoroalkyl group-containing polymer, the solid content weight ratio between said repellent and said fluorine-containing resin being (repellent):(fluorine-containing resin)=50:50 to 99:1, said perflouroalkyl group-containing polymer comprises a copolymer of a perfluoroalkyl group-containing ethylenically unsaturated monomer and one or more other monomers, said perfluoroalkyl group-containing ethylenically unsaturated monomer is at least one compound selected from the group consisting of:

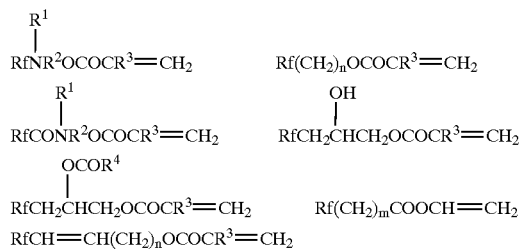

in the formulas, Rf represents a perfluoroalkyl group whose alkyl moiety contains 4 to 20 carbon atoms, $R^1$ represents hydrogen or an alkyl group containing 1 to 10 carbon atoms, $R^2$ represents an alkylene group containing 1 to 10 carbon atoms, $R^3$ represents hydrogen or a methyl group, $R^4$ represents an alkyl group containing 1 to 17 carbon atoms, n represents an integer of 1 to 10 and m represents an integer of 0 to 10, said other monomers are selected from the group consisting of alkyl(meth)acrylates containing 1 to 20 carbon atoms in the alkyl moiety, cyclohexyl(meth)acrylate, benzyl(meth)acrylate, polyethylene glycol di(meth)acrylate, N-methylolacrylamide, ethylene, vinyl chloride, (meth)acrylamide, styrene, α-methylstyrene, p-methylstyrene, vinyl alkyl ethers containing 1 to 20 carbon atoms in the alkyl moiety, halogenated alkyl vinyl ethers containing 1 to 20 carbon atoms in the alkyl moiety, vinyl alkyl ketones containing 1 to 20 carbon atoms in the alkyl moiety, maleic anhydride, butadiene, isoprene, chloroprene and silyl-containing vinyl monomers, said fluorine-containing resin comprises a fluororesin or a mixture of a fluororesin and some other resin, said fluororesin comprises a copolymer of a fluoroolefin and a vinyl monomer or a copolymer of fluoroolefins, or is obtained by seed polymerization of an acrylic resin.

2. The durable water repellent agent according to claim 1, wherein the silyl-containing vinyl monomer is selected from the group consisting of vinyltriethoxysilane, vinyltrimethoxysilane and γ-(methacryloxypropyl)trimethoxysilane.

3. The durable water repellent agent according to claim 1, wherein the fluorine-containing resin derives from an aqueous dispersion or dissolving in a solvent.

4. The durable water repellent agent according to claim 1, wherein said other resin is an acrylic resin.

5. The durable water repellent agent according to claim 1, wherein the copolymer of fluoroolefins is a copolymer of vinylidene fluoride and a fluoroolefin other than vinylidene fluoride.

6. The durable water repellent agent according to claim 5, wherein the fluorine-containing resin derives from an aqueous dispersion.

7. A coated article which comprises being coated with the durable water repellent agent according to claim 1.

8. The coated article according to claim 7, wherein the surface of the article comprises a porous substrate material.

9. The coated article according to claim 8, wherein the porous substrate material is concrete.

10. The durable water repellent agent according to claim 1 which is used for concrete, wood or cloth.

* * * * *